United States Patent [19]
Yevick

[11] 3,944,350
[45] Mar. 16, 1976

[54] MICROFICHE AND READER

[75] Inventor: George J. Yevick, Leonia, N.J.

[73] Assignee: Personal Communications, Inc., Stamford, Conn.

[22] Filed: Aug. 13, 1974

[21] Appl. No.: 497,084

Related U.S. Application Data

[62] Division of Ser. No. 309,968, Nov. 28, 1972, Pat. No. 3,864,034.

[52] U.S. Cl.................. 353/27 R; 353/38; 353/85
[51] Int. Cl.² ......................................... G03B 23/08
[58] Field of Search .................. 353/25–27, 353/38, 120, 26 R, 26 A, 27 R, 27 A, 85

[56] References Cited
UNITED STATES PATENTS

| | | | |
|---|---|---|---|
| 3,704,068 | 11/1972 | Waly | 353/27 |
| 3,712,724 | 1/1973 | Courtney-Pratt | 353/38 |
| 3,770,344 | 11/1973 | Fukushima | 353/38 |

FOREIGN PATENTS OR APPLICATIONS

| | | | |
|---|---|---|---|
| 1,533,550 | 6/1968 | France | 353/38 |

OTHER PUBLICATIONS

Light–Emmitting Semiconductors, Scientific American, May, 1967, at 109.

*Primary Examiner*—Richard E. Aegerter
*Assistant Examiner*—A. J. Mirabito
*Attorney, Agent, or Firm*—Thomas J. Greer, Jr.

[57] ABSTRACT

A microfiche having one surface embossed or molded to define a multiplicity of small lenses (lensettes) integral with the microfiche. Each micro-image is stored directly below a corresponding lensette, thereby assuring optical distance registry between each micro-image and its projection. Lateral optical registry is also realized. In an embodiment, interlensette surface of the microfiche is made opaque to preclude optical cross-talk.

7 Claims, 19 Drawing Figures

MICROFICHE AND READER

This is a division of application Ser. No. 309,968, filed Nov. 28, 1972, now U.S. Pat. No. 3,864,034 filed Feb. 4, 1975.

This invention relates to a distributed optical information storage and retrieval system. It more particularly relates to a novel method for positioning the intelligence on a microfiche with respect to lenses for projecting the intelligence on a viewing screen.

In certain prior constructions of micro-optic readers, (such as described in copending application Ser. No. 135,996, filed Apr. 2, 1971 by Adnan Waly for "Micro Image Recording And Read Out System," and assigned to the same assignee as this application, now U.S. Pat. No. 3,704,068 of Nov. 28, 1972) a microfiche defined by an emulsion film carried on one surface of a clear plastic sheet is positioned next to a plastic plate having discrete optically active surfaces, i.e., lenses. An apertured mask may be employed, the mask inhibiting overlapping of adjacent information. The proturberances function as lenses (termed lensettes because of their small size) and are intended to be aligned with optical bits of information on the microfiche emulsion, thereby projecting and magnifying the bits. In such constructions it is of paramount importance that the distance between the emulsion and the lensettes remain constant during all readout movements of the microfiche and over all portions of its area. This is so because of the relatively small focal lenghts of the lensettes and the degree of magnification involved. Thus, relatively small variations in the distance between the emulsion and lensettes cause large changes in the final, projected image of the intelligence. If, for example, the viewing screen and microfiche are 8 inches × 10 inches, then the distance between the emulsion and lensettes must not vary even as much as a mil over the 80 sq. inches area if satisfactory images of the intelligence are realized.

According to the practice of the instant invention, this criticality is eliminated by embossing or molding the microfiche to thereby define lensettes on and integral with the fiche itself. Thus, the emulsion which carries the information, and the clear plastic sheet (e.g., methyl methacrylate) which carries the emulsion, and the lensettes, all define a unitary structure. By this construction, movement of the microfiche relative to projecting light sources (in order to read out the information) cannot result in variations of the distance between the emulsion and the projecting lensettes. This distance now becomes a function only of the microfiche thickness, a quantity which may be accurately controlled during manufacture of the microfiche.

In an embodiment, the apertured mask is replaced by opaque coatings on the microfiche, between the lensettes.

IN THE DRAWINGS

Figure 1:
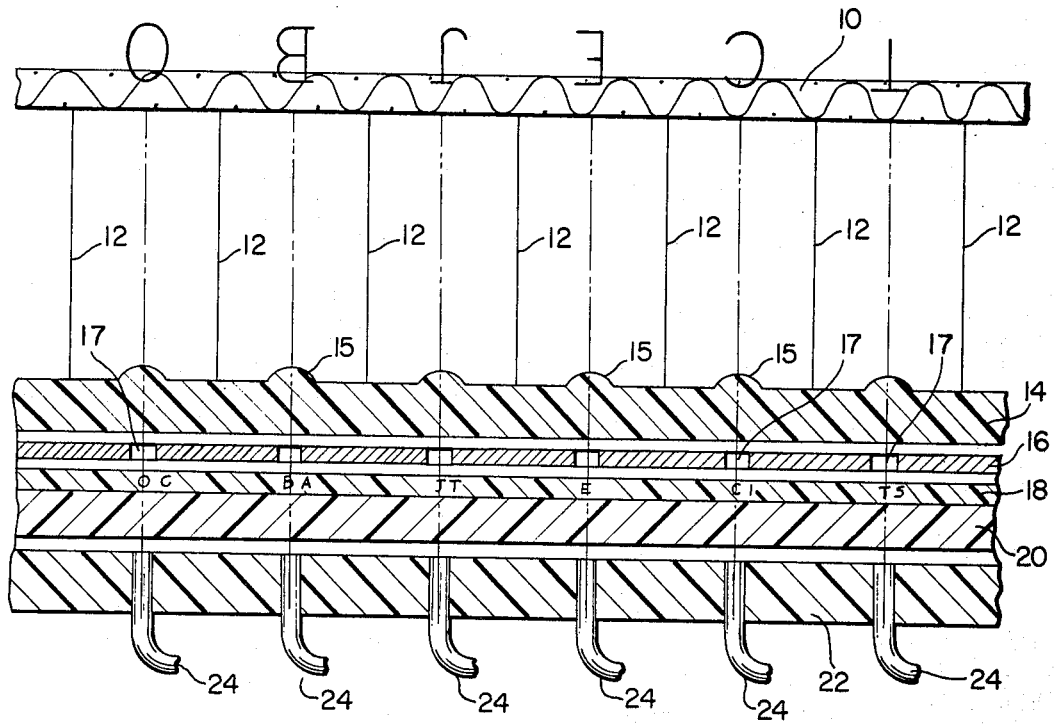
FIG. 1 is a partial cross-sectional view of a prior art distributed optics microfiche reader.

Referring now to FIG. 1 of the drawings, a prior art construction of a microreader such as shown in the noted Waly patent is schematically illustrated. The numeral 10 denotes a viewing screen formed of, for example, a translucent material. Septa 12 are positioned as indicated and extend downwardly from the screen 10 to plate 14, the septa dividing the entire surface of the screen 10 into small areas or cells. The purpose of the septa is to inhibit crosstalk, i.e., image overlapping. The numeral 14 denotes a lens plate having integral nodules or proturberances 15, each of which defines a projecting lens for projecting onto the under surface of screen 10. The lens plate 14 may be formed of, for example, clear plastic having an index of refraction of approximately 1.5. The numeral 16 denotes a mask having spaced openings or apertures 17 which are in alignment with the optical axes of the various lensettes 15. The numeral 18 denotes an emulsion, greatly exaggerated in thickness for purposes of illustration, carried by a plate 20 of, for example, a clear plastic such as methyl methacrylate. The element 20 with its emulsion 18 is termed a microfiche. The numeral 22 denotes a spacing or positioning plate which carries a plurality of fiber optic light conducting pipes or tubes 24. The upper termini are aligned with the optic axes of the several lensettes 15. The light pipes 24 are fed in a conventional manner to a suitable source of illumination.

For purposes of illustration, micro images of the letters (bits) of the word OBJECT, in distributed or spaced form, are carried by the emulsion 18. A second information set which might contain the words CAT IS is also carried by the emulsion 18.

In operation, the microfiche 20 is inserted between the lens plate 14 and the positioning plate 20 and the source of illumination (not illustrated) is energized. Light passes from the light pipes 24 through the transparent body of the microfiche, through the emulsion 18 which carries the intelligence. The several letters of the information OBJECT are thus projected through the apertures 17 of the mask 16 and pass through lensettes 15. The projection thus appears in inverted form (because only a single lens has been used) on the viewing screen. In order to view the next segment, as for example the next page, of information recorded on the microfiche 20, the microfiche is moved to the left by an indexing mechanism, thereby aligning the letters (bits) of CAT IS with the openings 17. The letters of this second message will then appear on the viewing screen 10, as in the first case.

Because of the relatively small focal lengths of the lensettes 15, it is important that the distance between the emulsion 18 and the lensettes 15 vary by less than 1 mil over the entire surface of the fiche and during all movements of the microfiche relative to the lens plate 14 and plate 20 during the scanning or readout procedure. If the screen 10 is relatively large, say 8 inches × 10 inches, then this would require that all of the distances between the lensettes 15 and the emulsion 18 over the entire 80 sq. inches vary by less than 1 mil. This is difficult to realize in practice and any variations in this critical distance adversely affects the quality of the image on viewing screen 10.

Figure 2:
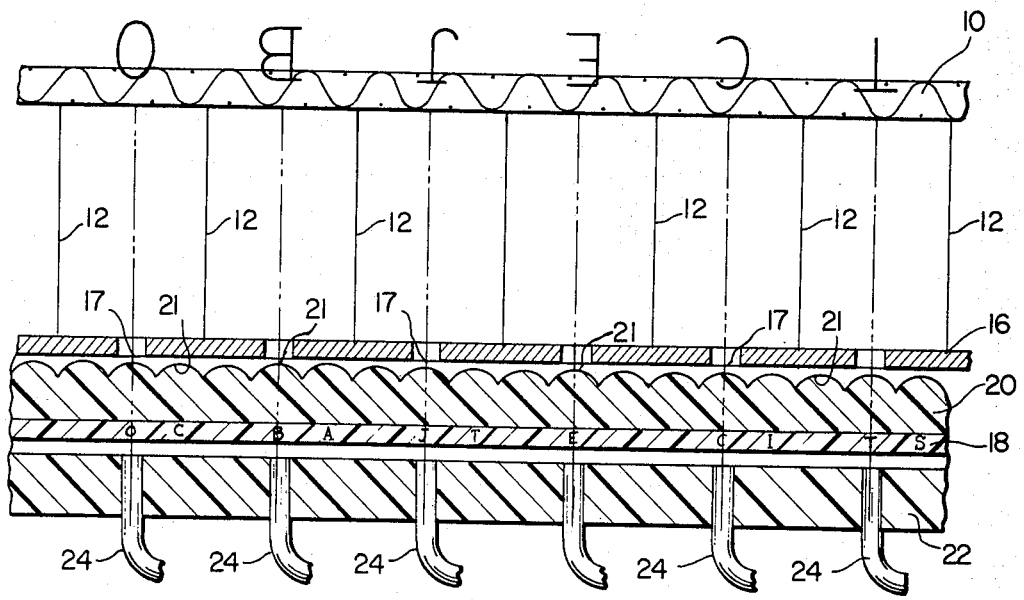
FIG. 2 is a view of a similar reader, but showing the novel microfiche construction of this invention.

Referring now to FIG. 2 of the drawings, the improvement of this invention is illustrated. Here, the same numerals represent the same elements as in FIG. 1. It will be observed, however, that lens plate 14 which carries the lensettes 15 is omitted. Instead, the microfiche 20 itself is provided, on one surface, with a multiplicity of integral lensettes each denoted by the numeral 21. The emulsion 18 is placed directly against the termini of light pipes 24, and mask 16 placed on top of microfiche 20. Again, for purposes of illustration the drawings show schematically a part of a message containing the word OBJECT carried by the emulsion 18. Again, illumination of light pipes 24 causes light to pass through the emulsion 18, illuminating the individual letters or bits of the message, the light rays then continuing through the microfiche striking the lens elements 21, and again being projected on viewing screen 10.

The lens elements 21 are formed by embossing or molding the top surface of microfiche 20, the microfiche exhibiting over its entire top surface a multiplicity of lens elements 21, much as in the manner of a street paved with cobblestones.

A comparison of FIGS. 1 and 2 readily illustrates the advantages of the invention. For example, referring to FIG. 1, if the microfiche 20 moves even slightly toward or away from the lens elements 15, the quality of the final image as viewed on screen 10 will suffer. Yet, such movement is entirely possible because of, among other things, the necessary clearance between the top of plate 22 and the bottom of plate 14. In distinction to this behavior, a consideration of FIG. 2 will show that no matter how the microfiche 20 is moved, the distance between the emulsion 18 and the lens elements 21 will remain constant. This distance corresponds to the thickness of the microfiche and is very easily controlled to a high degree of accuracy at its place of manufacture. It will be observed that each letter in the intelligence carried by emulsion 18 centers on the optic axis of each corresponding lens element 21. This follows from the fact that the arrangement of FIG. 2 is used as a taking camera. The intelligence to be microfilmed is placed on the screen 10 and photographed, so to speak, by the emulsion 18. During this process, each of the septa 12 and each aperture 17 in mask 16 insures that only one letter of the intelligence on a screen 10 appears directly below each lens 21 on emulsion 18.

Thus, there is always optical alignment between the reduced letters or intelligence carried by the emulsion and their corresponding lens element 21. Further, if there is a slight inaccuracy in the embossing or molding process during manufacture, the error is undone in the viewing or readout because each lensette acts as a camera in the taking process. Thus, lateral positioning of each optical bit (letter) with respect to the optic axis of each lensette are no longer a critical factor.

Figure 3:
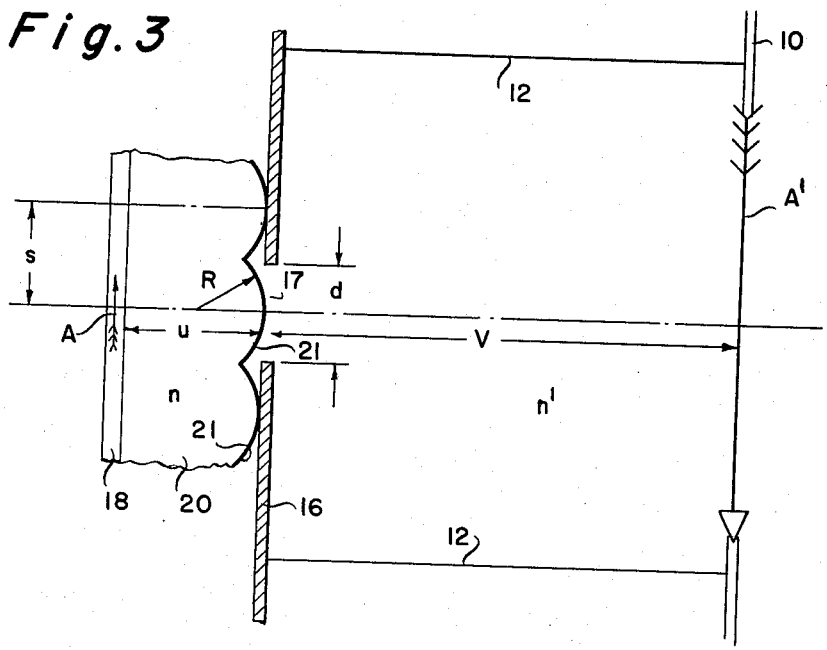
FIG. 3 is an enlarged view of a portion of FIG. 2.

FIG. 3 illustrates certain relations between the microfiche thickness, the lensette radii, and the magnification of the construction illustrated at FIG. 2 of the drawings, the microfiche object carried by the emulsion 18 being an arrow A and its projection on the viewing screen by A'.

The following relations obtain in FIG. 3:

$$\frac{n}{u} + \frac{n'}{v} = \frac{n'-n}{R}$$

and the magnification is:

$$m = -\frac{nv}{n'u}$$

where:
 $u$ is the object distance
 $n$ is the index of refraction in the object space
 $v$ is the image distance
 $n'$ is the index of refraction in the image space
 $R$ is the radius of curvature of the refraction surface
 $m$ is the magnification The following example will illustrate these relations, where $m = 25$ and $n = 1.5$ (e.g. plexiglass). For standard 7 mil film, $u = 7$ mils, $m = 25$, and $n = 1.5$. Then $v = 117$ mils and $R = 2.25$ mils. (Such small lensettes 21 are perfectly feasible optically and very high quality resolution for them has already been demonstrated by K. Peter; see Physikalishe Blatter, Vol. 17, page 21, 1961.)

Assume the image of an individual letter on screen 10 to be a character 100 mils in height and 100 mils wide. Therefore, the "object" in the emulsion 18 will be contained in an area 4 mils by 4 mils. Hence, the spacing s between the axes of adjacent lensettes is 4 mils.

The mask 16 with its aperture stops 17 plays an important role in the construction illustrated at FIG. 2. The mask 16 is stationary with respect to screen 10, septa 12, and plate 22 which supports light pipes 24. The size of the aperture 17 of the mask depends upon the optimum $f$ number and is determined as follows:

The focal length $f$ of a lens is given by the relation $$\frac{n'}{f} = \frac{n'-n}{R}$$

Hence, for $n' = 1.5$ and $n = 1$ and $R = 2.25$ mils $$f = 3 \times R = 6.75 \text{ mils}$$

The optimum $f$ number, denoted by f', should be 4, according to W. E. Rudge et al in their monograph regarding Fly's-Eye Lens Technique, etc., described in I.B.M. Journal, page 146 et seq. for April, 1963. An $f$ number f' greater than 4 means loss of paraxial resolution due to refraction, and $f$ numbers around 3 or less yield loss of resolution due to geometric abberations.

The $f^*$ number is given by $$f = \frac{\text{focal length}}{\text{aperture opening}}$$

Consider the case where the distance $u$ is 7 mils, corresponding to microfiche thickness of 7 mils. Here, $R = 2.25$ mils and the focal length equals 6.75 mils. For optimum $f$ of 4, the diameter of the mask openings 17 should be:

$$\text{aperture opening} = \frac{6.75}{f} = \frac{6.75}{4} = 1.69 \text{ mils}$$

Figure 4A:
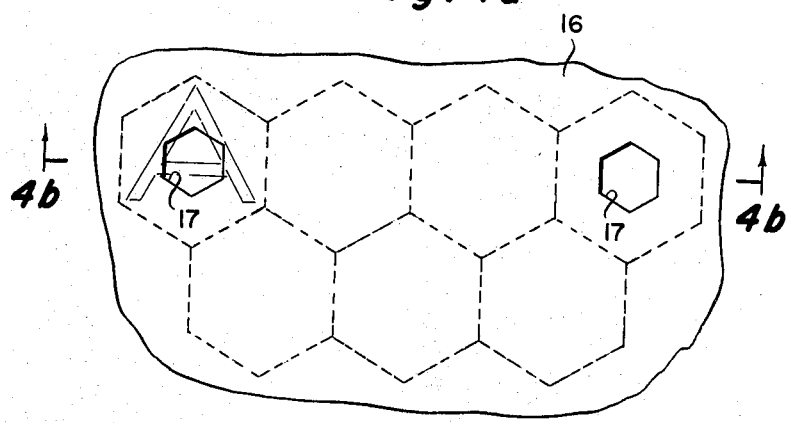
FIGS. 4a and 4b are similar to FIG. 3, and illustrate an optimum shape of individual micro-optical cells.
Figure 4B:
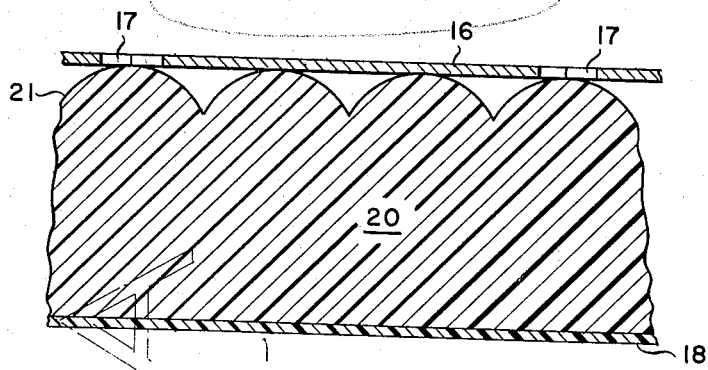

These relations are illustrated at FIGS. 4a and 4b of the drawings. It is seen that the aperture openings 17 cover the central portion of the area of each lensette 21 and that the information bits schematically indicated (A) contained in the emulsion 18 are larger than the openings 17. The distance between apertures 17 is one-tenth inch and there would thus be, for this example, 25 lensettes 21 between the apertures. The areas indicated by the dashed lines contain the stored bits and are close-packed, as indicated, for maximum storage density.

In view of the extermely small distances between the micro images on emulsion 18, the small radius of curvature of lensettes 21, the small mask openings 17, and the necessity of accurate alignment of the optic axes of lensettes 21 with the openings 17, even the smallest departure from intended sizes and distances is quite significant. With, for example, an 8 inches × 10 inches lensfiche, there are five million apertures 17 in mask 16 and a corresponding five million lensettes 21, all of which must be properly aligned. (For an 8 inches × 10 inches lensfiche containing $80 \times 10^6$ square mils, each 4 × 4 mil emulsion cell for the microimages contains 16 square mils, there are $80 \times 10^6/16 = 5 \times 10^6$ lensettes). The vertical distance from the mask openings 17 to the micro images on emulsion 18 is also important, otherwise overlapping (cross-talk) between the cells in emulsion 18 may occur. Thus the actual fabrication of the previously described embodiment which must satisfy the enumerated conditions is difficult to realize.

Figure 5:
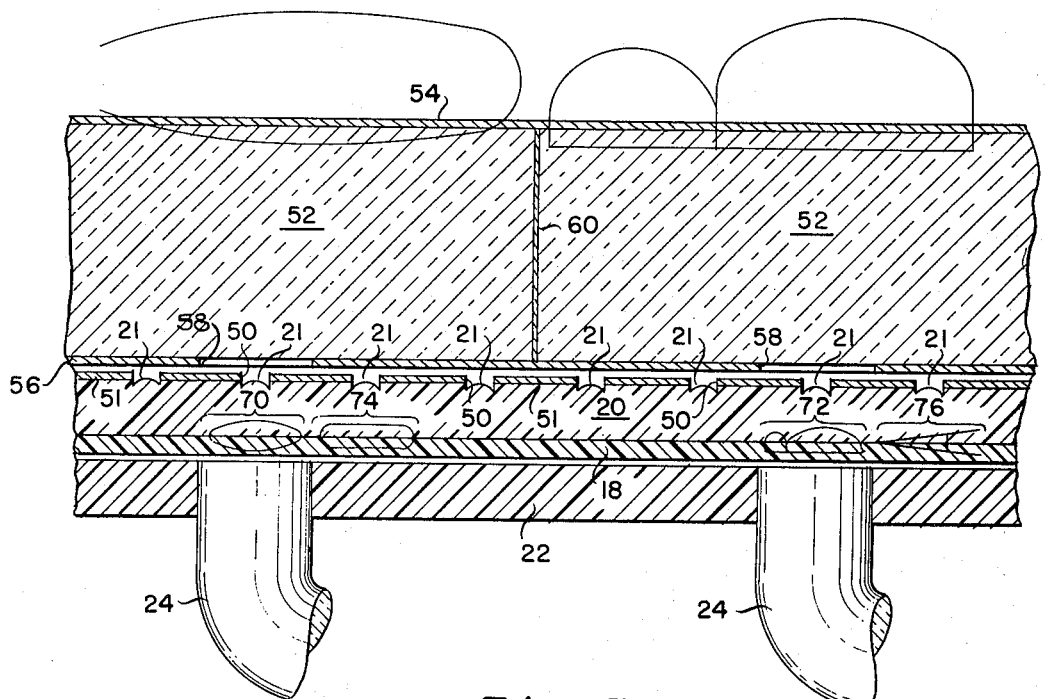
FIG. 5 is a view similar to FIG. 2, and illustrates an embodiment wherein interlensette surface is opaque.
Figure 6:
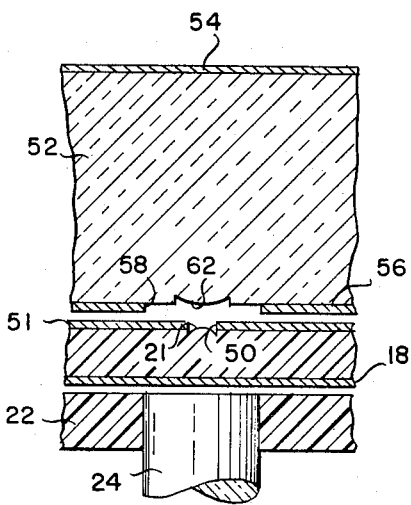
FIG. 6 is a partial view, similar to FIG. 5, and illustrates another embodiment.
Figure 7:
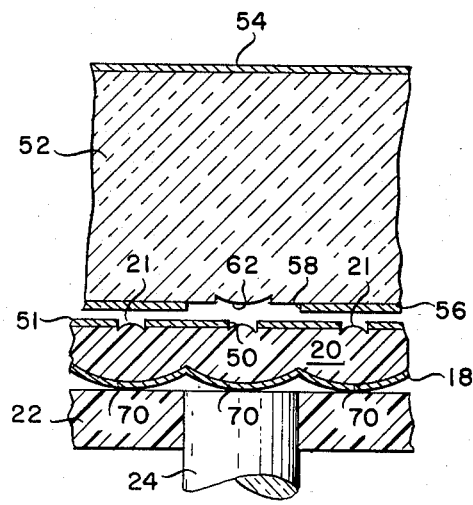
FIG. 7 is a view, similar to FIG. 6, and illustrates an embodiment wherein the micro-images reside on Petzval surfaces.

The embodiment of FIGS. 5, 6 and 7 substantially lessens the effects of (inherent) fabrication tolerances, in a manner now to be set forth.

Referring to FIG. 5, the numerals 18, 20 and 21 designate the same elements as previously described. The lensettes 21 are now spaced from each other along the plane of the lensfiche and are depressed, lying each in a depression or cavity 50. The remaining areas of the top of the lensfiche, i.e., the interlensette area, are provided with an opaque coating denoted by the numeral 51. The numeral 52 denotes a transparent plastic block which may be of methyl methacrylate, the top surface of which may be coated with a light-diffusing film 54 adapted to serve as a viewing screen. The bottom surface 56 of block 52 is coated with an opaque substance, except for apertures 58, and may additionally be coated with an anti-friction material such as Teflon. Light pipes 24 carried by plate 22 illuminate the micro images carried by emulsion 18 for projection on viewing screen 54.

In operation, the lensfiche is moved (indexed) by sliding, and successive groups of lensettes 21 are exposed to those termini of light pipes 24 which are aligned with openings 58. The micro images carried by the emulsion are optically projected upwardly through lensettes 21, block 52 and appear in magnified form on screen 54. If desired, septa such as 60 may be molded into block 52 to inhibit overlapping of images on the viewing screen. Two letters of a recorded information set in emulsion 18 commencing with OBJECT are schematically illustrated. The micro image of the letter "O" is shown (necessarily out of scale due to drawing size limitations) on emulsion 18 and appears on screen 54 greatly magnified. Similarly, the micro image of the next letter "B" appears on screen 54. The 4 × 4 mil cells in emulsion 18 which contain these two micro images are denoted, respectively, by the areas underneath vincula 70 and 72.

In order to project the next information set on screen 54, the lensfiche is moved to the left. For this second information set, commencing for example with CAT IS, the first two letters "C" and "A" are illustrated as occupying adjacent 4 × 4 mil areas in emulsion 18 underneath vincula 74 and 76, respectively. Magnified images of the letters "C" and "A" will now appear on screen 54 in the same places illustrated for letters "O" and "B". The micro images of letters "O" and "B" now are positioned beneath opaque surface 56, laterally of opening 58, and are hence not projected on the screen.

Each lensette 21 is vertically aligned with a 4 × 4 mil area on emulsion 18, such areas being either square, or hexagonal (with 4 mil spaced centers), or any similar configuration which yields a close-packed cell arrangement for maximum utilization of the area of emulsion 18. Each aperture 58 corresponds in outline to the shape of the micro image cells in emulsion 18. Thus, if the apertures 58 are hexagonal, the micro image cells will be hexagonal.

The mask 16 and apertures 17 of the embodiment of FIG. 2 are replaced by opaque coatings 51 on the lensfiche and openings 58 on opaque coating 56. The problem of accurate optical alignment of mask openings with lensettes is thereby overcome. The openings 58 are of a diameter equal to the inter-lensette spacing, e.g., 4 mils in the example given, and small variations in this diameter are not critical.

FIG. 6 is a partial view of another embodiment, identical with the embodiment of FIG. 5, except that the lower surface of block 52 is provided with lens-defining curved surfaces 62. Such lenses 62 are positioned within each aperture 58 and define, with lensettes 21, a projection lens system which yields greater magnification than possible with lensettes 21 alone.

FIG. 7 illustrates an embodiment of the lensfiche itself. Here the lower surface of the lensfiche is provided with integral nodules 70 on which the emulsion 18 is placed. The surface of each nodule is of a special shape known as a Petzval surface. A Petzcal surface is one on which an image placed will yield maximum clarity and sharpness when projected. Each surface 70 is aligned with a corresponding lensette 21, and defines a microimage cell as in the previous embodiments. Such Petzval surfaces may also be employed with the embodiment shown at FIG. 2.

While discrete information units or bits, such as the letters in OBJECT and CAT IS have been selected to illustrate the invention thus far described, it will be understood that continuous forms of information may be also accommodated. Thus, photographs may also be first reduced and thence projected. Each scene on the viewing screen may be regarded as a macro scene, whether the same size as the original (a page of a book), smaller than the original (a mountain landscape) or larger than the original (enlargement of a microphotograph). Each macro scene corresponds to a unique set, termed an information set, of micro images in the lensfiche emulsion. In turn, each unique information set corresponds to a unique set of lensettes 21. Thus, referring to FIGS. 2 and 5, one information set includes the micro images of the letters in the word OBJECT, while another distinct and unique information set includes the letters in the phrase CAT IS. As shown, a lensette is aligned and associated with a single micro image. The same correspondence holds in the case of continuous information. The various information sets are interlaced in the sense of interlocked fingers and are also distinct as are the pieces of a jigsaw puzzle. The totality of information sets recorded on the lensfiche forms a mosaic whose individual elements are the dispersed areas of the various information sets.

The same advantages and mode of operation of the invention follow for a projection lens array which requires lensettes 21 to be concave with respect to the top surface of the lensfiche 20 instead of convex as has been illustrated. Further, in lieu of proturberances (convex lensettes) or depressions (concave lensettes) optical anisotropys in the fiche may be employed for the purpose of changing the direction of light rays. Accordingly, the phase "optically active surface" appearing in the claims is intended to embrace these distinct yet equivalent constructions.

The lensfiche is moved relative to the mask apertures, to successively expose distinct information sets, by an indexing mechanism, not illustrated, and which forms no part of this invention. The information sets and mask openings may be rectangularly arranged such as shown at FIG. 2 of the noted Waly application, and thus require both row and column indexing motions. The information sets and mask openings may also be arranged in a skew manner, such as shown at FIGS. 4 and 5 of the noted Waly patent, and thus require only column indexing.

From a consideration of FIGS. 2 and 5 of the drawings, it may be readily visualized that the same results are obtained with the microfiche stationery with respect to the screen and the mask relatively movable. Thus, referring particularly to FIG. 2, by placing a light pipe 24 underneath each microimage and fixing the microfiche relative to the screen 10 and supporting plate 22, indexing movement of the mask 16 will expose each set of microimages carried by emulsion 18 to an aperture 17, with attendant projection on the screen 10. With the FIG. 5 construction, each lensette 21 may be provided with a corresponding light pipe 24. The opaque coating 56 on the bottom of screen block 52 is replaced with an opaque mask having apertures 58 of the same size as shown, the mask undergoing sliding (indexing) motion with respect to the stationary microfiche and screen and positioned between them. Again, each set of microimages carried by the microfiche is sequentially exposed through mask openings 52 for projection onto the viewing screen. The opaque coatings 51 (FIG. 5), as before, inhibit cross-talk (overlapping of projected images). However, the septa 12 of FIG. 2 and 60 of FIG. 5 are omitted in the movable mask embodiment.

It will be noted that upon changes in dimensions of the lensfiche 20 due to either temperature or humidity fluctuations, the optical registry between the emulsion-carried intelligence and the lensettes 21 will not be disturbed. They will both suffer or undergo the same displacement.

An embodiment will now be described wherein the lensfiche is illuminated from the top or front, in distinction to bottom or rear lighting as in the previously described constructions. By reference to FIG. 5, for example, a rear lighting mode requires both lensfiche surfaces to be transparent. Further, the location of the light pipes adds thickness to the entire reader ensemble since they require space on the side of the lensfiche opposite the viewing screen.

Figure 8:
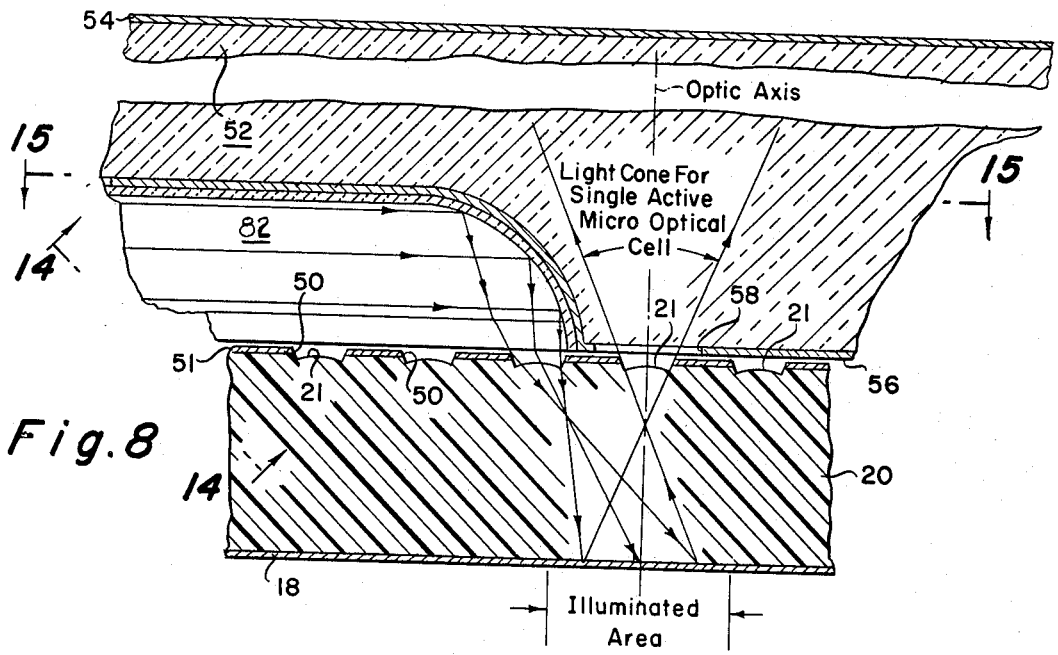
FIG. 8 is a view, similar to FIG. 2, illustrating an embodiment wherein the micro-images carried by the fiche are illuminated for readout from the top or front.

FIG. 8 illustrates such a front lighting embodiment. Referring now to FIG. 8, the numeral 82 represents one of a plurality of light-pipe elements which lie in troughs in the bottom surface of transparent plastic plate 52. The light-pipe 82 is preferably externally coated so as to produce total internal reflection. Similarly, the surface and end of the trough in which the light-pipe 82 is positioned may be mirrored. As indicated by the arrows coming from the left in FIG. 8, light passing down light-pipe 82 is reflected at the end of the tube and into one of the lensettes 21. This light continues through fiche 20 until striking the lower portion where the emulsion 18 is located. A portion of the light is then reflected upwardly. Of all this light reflected upwardly, a portion will define a light cone through the adjacent lensette 21. Thus, the micro-image immediately below the lensette through which the light cone passes, as indicated, is projected onto the screen 54 of the plate 52.

In order to read or scan the next information set, i.e., the next stage for example, the fiche 20 is indexed to the left so that the lensette 21 associated with the illustrated light cone is now the lensette through which the light from light pipe 82 passes to illuminate the next adjacent micro-image on emulsion 18. As will presently be further explained, each aperture 58 of transparent plate 52 has associated therewith an adjacent end of a light-pipe 82. The optic axis, as indicated, will remain the same while the fiche 20 is indexed to successively read out the information.

Figure 9:
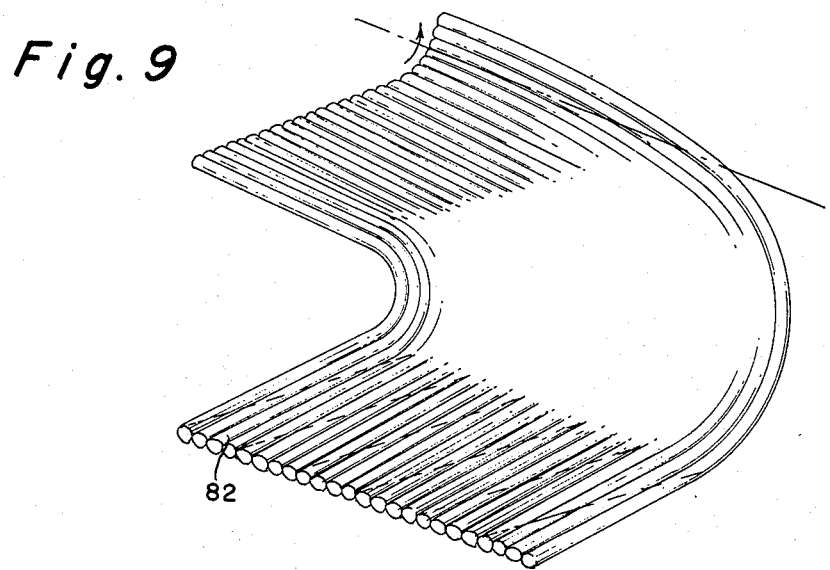
FIG. 9 is a perspective view of an illuminating device, and its manner of fabrication, used in the embodiment of FIG. 8.
Figure 10:
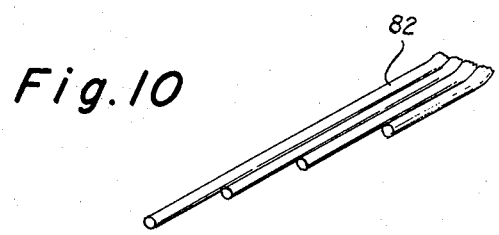
FIG. 10 is a partial view of FIG. 9, at a later stage in formation.

FIG. 9 illustrates one step in fabricating the front or top illumination embodiment shown at FIG. 8. Initially, a clear plastic such as methyl methacrylate may be coated with a substance having a different index of refraction so as to produce total internal reflection. Next, a set of dies in the configuration illustrated at FIG. 9 is applied to the top and the bottom of a plane methyl methacrylate sheet. The dies being pressed together, the result as indicated at FIG. 9 follows. That is to say, the plastic sheet which was once plane on both surfaces is now transformed into a plastic sheet having a series of regular and longitudinal indentations for the purpose of defining the equivalent of individual light-pipes. As the next step, the forward end, as viewed at FIG. 9, of the light-pipes 82 is cut as indicated to produce a saw-toothed configuration as partially indicated at FIG. 10. The ends of these forward light-pipes 82 are suitably beveled and coated with a reflecting surface, if desired, so that when placed in troughs in the bottom of plate 52 light will be reflected downwardly, as indicated at FIG. 8. Again, referring to FIG. 9, the outer rearmost end of the light-pipe ensemble is wrapped or curled about the indicated axis, it being recalled that the light-pipe ensemble is flexible. This results in the roll 80 shown at FIG. 11, with the individual series of saw-toothed sets of light-pipes 82 placed in the indicated bottom of plate 52.

Figure 12:
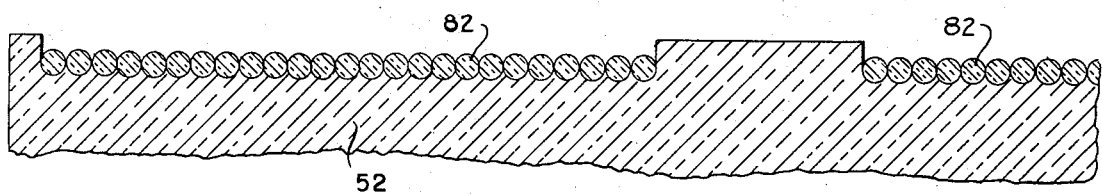
FIG. 12 is a view along line 12—12 of FIG. 11.
Figure 13:
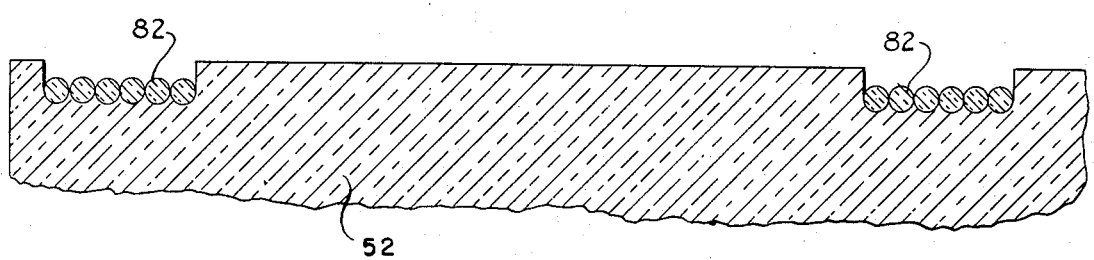
FIG. 13 is a view along line 13—13 of FIG. 11.
Figure 14:
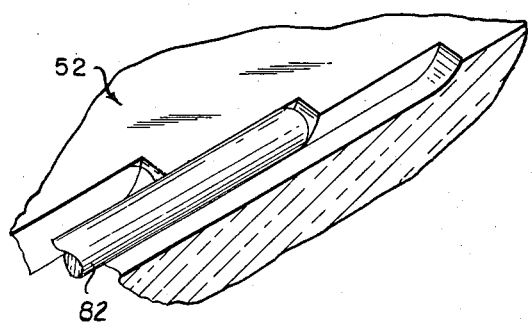
FIG. 14 is a partial perspective view along line 14—14 of FIG. 8 and illustrates the ends of the light rods abutting channel ends in the viewing screen.

FIGS. 12 and 13 indicate the trough formation in the bottom of plate 52, and show that as the distance to the ends of the saw-teeth is increased, the number of individual light-pipes 14 which abut reflecting surfaces decreases. FIG. 14 illustrates how the various ends of the individual light-pipes 82 abut the ends of the troughs in plate 52.

Figure 15:
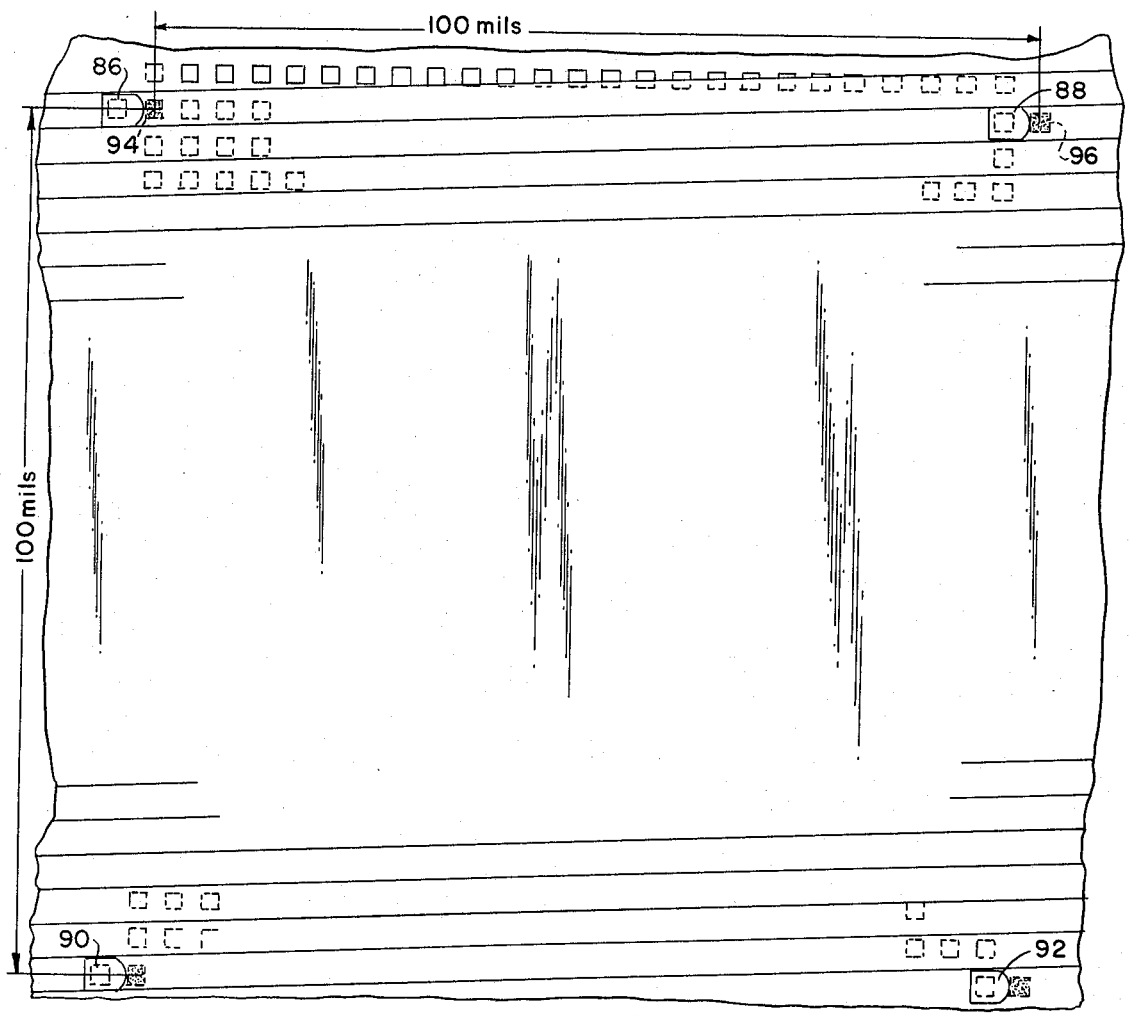
FIG. 15 is a view taken along section 15—15 of FIG. 8.

Reference now to FIG. 15 will further illustrate the front or top lighting embodiment. The ends of the individual light pipes 82 are denoted by the numerals 86, 88, 90 and 92. The adjacent lensettes 21, through which the reflected light passes upwardly for projection on screen 54, are designated by numerals 94, 96. As indicated, the lensettes 21, corresponding to apertures 58, through which the projections are made are spaced 100 mils apart, their being 25 4 × 4 micro-image storage areas on the emulsion 18 between the apertures 58 through which the projection proceeds.

Figure 11:
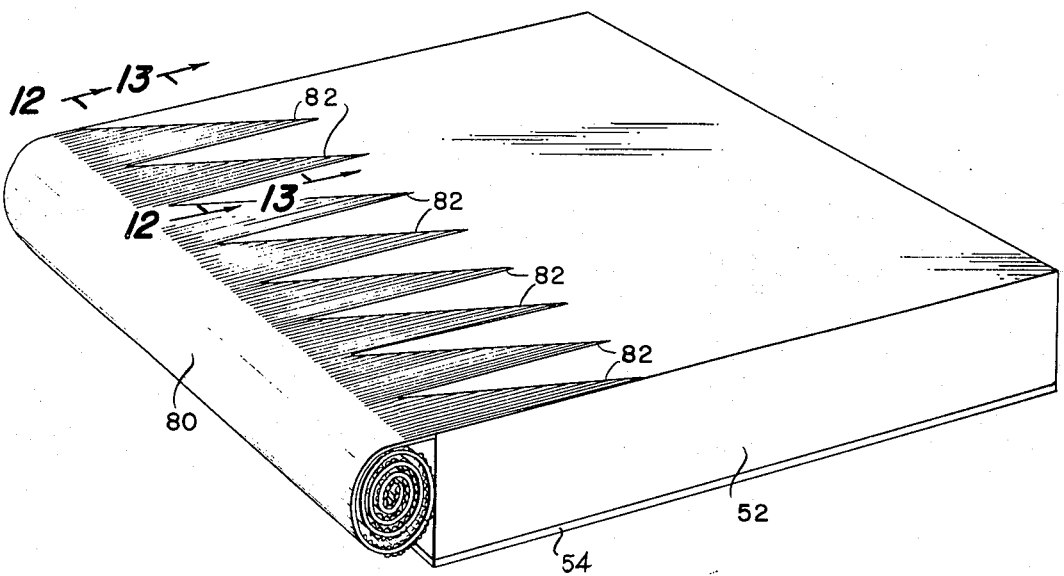
FIG. 11 is a perspective view of the front illuminating arrangement of FIG. 8.
Figure 16:
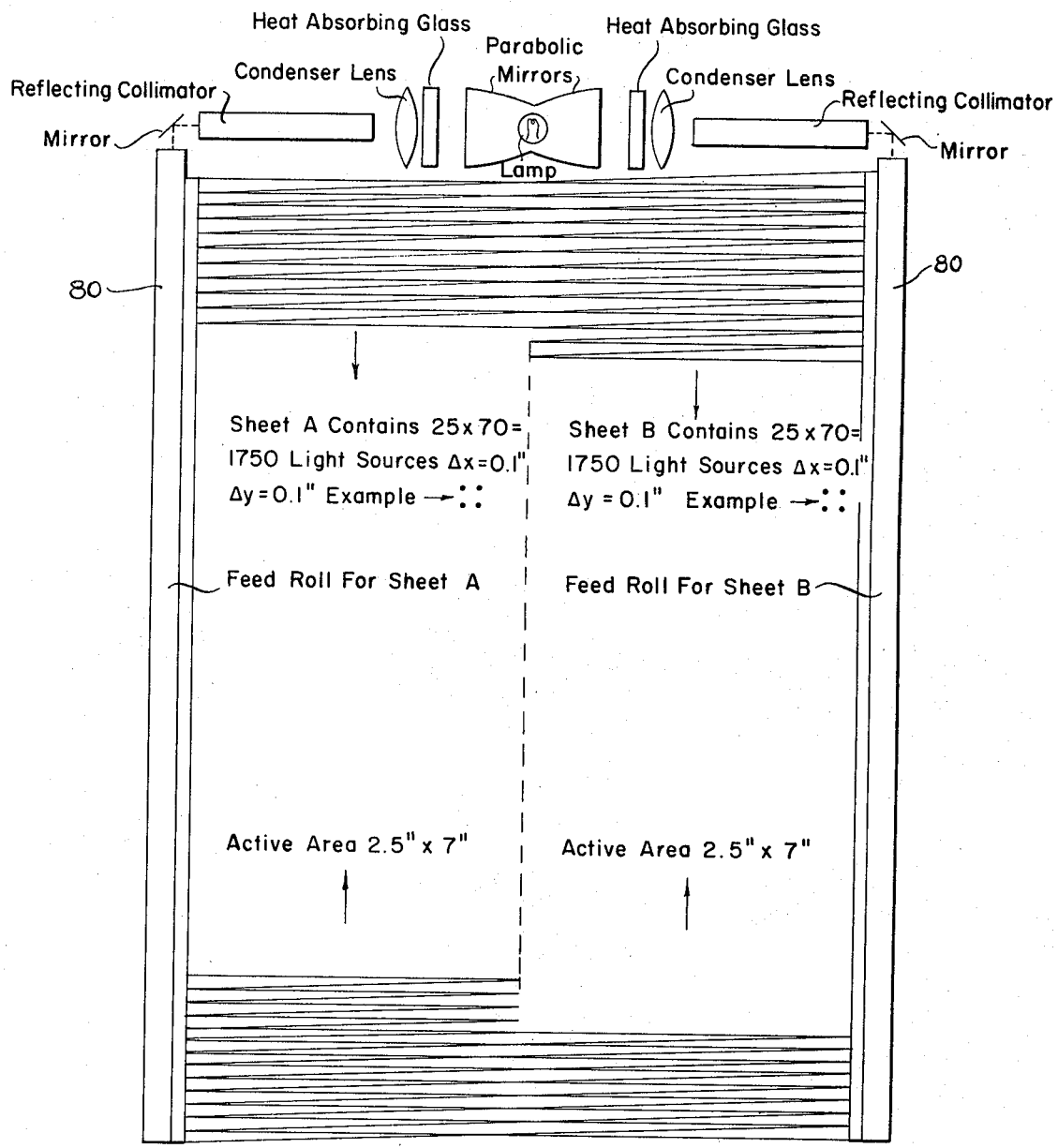
FIG. 16 is a front view, partially schematic, of a reader having a front illuminated fiche.

FIG. 16 further illustrates a construction wherein top or front lighting is employed. FIG. 16 may be viewed as a further stage in the construction partially illustrated at FIG. 11. In FIG. 11, only half of the plate 52 is illustrated as provided with the illuminating light-pipes 82. In FIG. 16, both sides of the plate 82 are provided with a roll 80. As indicated at FIG. 16, the top ends of the two rolls 80 are illuminated as indicated, the top ends defining a plurality of parallel light-pipe ends arising through the process indicated by wrapping at FIG. 9.

Figure 17:
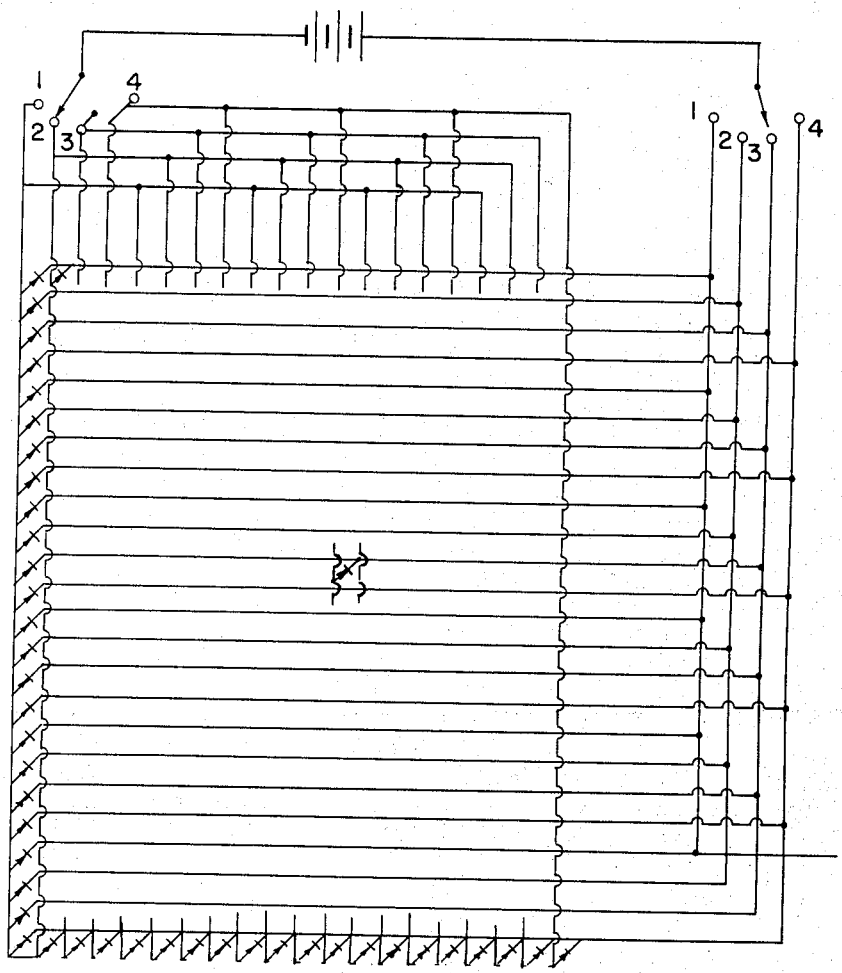
FIGS. 17 and 17a are schematic views of a mode employing a grid of light emitting diodes.
Figure 17A:
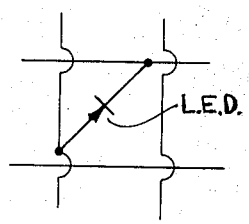

Reference to FIGS. 17 and 17a illustrates still another embodiment, wherein motion of the microfiche is not necessary for readout. In lieu of light pipes illuminating the rear of the microfiche, a grid of light emitting diodes (LED) may be employed, with one LED beneath each lensette. The mask 56 and apertures 58 may then be omitted from the embodiment of FIG. 5, and a consideration of FIG. 5 shows that by placing such a grid beneath a (stationary) microfiche 20, in lieu of light pipes, each LED in the grid will illuminate a corresponding and unique microimage in emulsion 18 and associated lensette 21. By energizing different sets of LEDS in the grid, as indicated by the several switch positions, different sets of microimages may be illuminated for projection through the lensettes and onto the viewing screen. By this substitution of LEDs for the light pipes, no movement between the microfiche and screen or between the (omitted) mask and microfiche is required for readout. FIG. 17a illustrates, schematically, a single LED of the grid.

In each of the described embodiments the actual scale has not been shown in all cases because of drawing size limitations. The same holds true for the number of lensettes between several of the mask apertures. In some cases angles have been greatly exaggerated for the purpose of clarity.

I claim:

1. A microfiche reader for projecting and viewing micro optic information, including,
   a. a viewing screen,
   b. an apertured mask spaced from said screen and parallel thereto,
   c. means for supporting a microfiche having optically active elements, said microfiche being parallel to said viewing screen and spaced therefrom,
   d. means to illuminate said microfiche and project micro images thereon through said mask apertures and thence onto said viewing screen,
   e. means for preventing overlapping of projected micro images on said screen, said means defined by opaque septa positioned between said screen and said apertured mask.

2. The microfiche reader of claim 1 wherein said septa divide the space between said screen and said apertured mask into a plurality of cells, there being one such cell for each of said apertures in the mask, said septa being normal to said screen.

3. The microfiche reader of claim 1, including:
   a. a microfiche positioned adjacent said apertured mask,
   b. said microfiche defined by a transparent sheet carrying a plurality of optically active elements, each of which is adapted to function as a projecting lens, the bottom surface of said microfiche carrying thereon micro images, each micro image optically aligned with one of said optically active elements,
   c. each aperture of said mask being aligned with an optically active element of said microfiche,
   d. the number of optically active elements being greater than the number of apertures in said mask.

4. The microfiche reader of claim 1 wherein said (d) means is defined by a plurality of side-by-side, touching light pipes adapted to project light through a fiche having optically active surfaces, at said surfaces, thence through said mask apertures onto the screen.

5. The microfiche reader of claim 4 wherein said (d) means is defined by a plurality of light pipes carried by the lower portion of said viewing screen and having means at the ends thereof for projecting light downwardly and away from said viewing screen, whereby light may be projected downwardly through one surface of an optically active element of a microfiche to illuminate a micro image carried thereby on an opposite surface.

6. The microfiche reader of claim 4 wherein each of the illuminating light output ends of said light pipes project light onto a relfecting surface, to thereby illuminate a single micro image of a microfiche, the reflecting surfaces being spaced from each other, said light pipes being supported by a plate.

7. A microfiche reader including,
   a. a viewing screen,
   b. a support for a microfiche, said support being generally parallel to said viewing screen,
   c. means to illuminate a microfiche placed on said support, said means defined by a matrix of light sources coupled to enable predetermined sub-sets thereof to be energized,
   d. said light sources defined by light emitting diodes, said diodes having switching circuits to enable predetermined sub-sets only of said diodes to be energized, thereby permitting selected information sets carried by a microfiche to be projected to a viewing screen,
   e. means for preventing overlapping of projected micro images on said screen, said means defined by opaque septa positioned between said screen and said microfiche support.

* * * * *